US005774609A

United States Patent [19]
Bäcklin et al.

[11] Patent Number: 5,774,609
[45] Date of Patent: Jun. 30, 1998

[54] METHOD AND ARRANGEMENT FOR COUPLING A WAVE GUIDE TO A COMPONENT

[75] Inventors: Lennart Bäcklin, Stockholm; Ylva Bäcklund, Uppsala; Håkan Elderstig, Bromma; Stefan Lindgren, Täby; Odd Steijer, Bromma, all of Sweden

[73] Assignee: Telefonaktiebolaget LM Ericsson, Stockholm, Sweden

[21] Appl. No.: 786,734

[22] Filed: Jan. 27, 1997

[30] Foreign Application Priority Data

Jan. 26, 1996 [SE] Sweden .................................. 9600292

[51] Int. Cl.[6] .......................................................... G02B 6/30
[52] U.S. Cl. ................................ 385/49; 385/88; 385/31
[58] Field of Search .................................. 385/49, 14, 92, 385/88, 94, 37, 47, 31, 131, 15; 372/36

[56] References Cited

U.S. PATENT DOCUMENTS

| | | | |
|---|---|---|---|
| 4,768,199 | 8/1988 | Heinen et al. | 372/36 |
| 5,163,113 | 11/1992 | Melman | 385/31 |
| 5,577,142 | 11/1996 | Mueller-Fiedler et al. | 285/47 |
| 5,600,741 | 2/1997 | Hauer et al. | 385/49 X |

FOREIGN PATENT DOCUMENTS

| | | |
|---|---|---|
| 0607524 | 7/1994 | European Pat. Off. . |
| 0634676 | 1/1995 | European Pat. Off. . |
| 4323828 | 1/1995 | Germany . |

OTHER PUBLICATIONS

Patent Abstracts of Japan, vol. 7, No. 51, p. 179, abstract of JP A, 57–198420, Dec. 6, 1982 to Fujitsu K.K.
International–Type Search Report for National Application No. 9600292–8, Search Request No. SE 96/00074, mailed Oct. 18, 1996.

Primary Examiner—Phan T.H. Palmer
Attorney, Agent, or Firm—Burns, Doane, Swecker & Mathis, L.L.P.

[57] ABSTRACT

Optical components intended for telecommunications purposes must be manufactured and mounted with a great degree of accuracy, since a component, such as an optochip, when mounted must be coupled optically, electrically, mechanically and thermally at the same time. In order to obtain a right-angled geometry when using surface-emitting or surface-detecting components, and to obtain a reduced optical travel path and accurate fixation of an optofiber, a reflective surface (12) which slopes at an angle of 45 degrees is arranged between a light-conducting core (16) and the active surface (10) of an optochip, and the light-conducting core has been placed closer to the reflective surface by bevelling the optofiber (9) and fitting the fiber in a V-groove and accurately fixating the fiber in the groove by means of a flat cover means (20). The aforesaid solutions relate generally to problems of a geometrical nature, but are able to provide important advantages in the arrangement of optical components in so-called optical micro-structures in comparison with earlier known techniques with regard to requirements of space, signal transmission performances and manufacturing costs.

11 Claims, 2 Drawing Sheets

METHOD AND ARRANGEMENT FOR COUPLING A WAVE GUIDE TO A COMPONENT

FIELD OF THE INVENTION

The present invention relates to a method and to an arrangement for coupling a waveguide to a light-emitting or light-detecting component, such as for coupling an optofibre to an optochip.

DESCRIPTION OF THE PRIOR ART

Optical components intended for telecommunications purposes are expensive. A considerable part of the cost of fabricating an optical component can be referred to the coupling established between an optochip, the light-emitting or light-detecting component, and an optofibre, the waveguide. Extremely high mechanical demands are placed on the criterion of "component alignment", the required precision in this regard lying in the order of 1/1000 mm. Advanced mounting methods and high-grade precision mechanics with elements made of special alloys are needed to meet this requirement, which is reflected in the cost.

Fabrication can be simplified by using small silicon plates as micromechanical substrate carriers. Silicon has many advantages which provide the unique possibility of producing micromechanical structures that can be used for alignment purposes. The carriers can be processed in parallel, therewith enabling many "carrier chips", to be obtained from one silicon plate, which can result in low manufacturing costs. Silicon has also highly effective electrical and thermal properties, which are necessary in achieving functional mounting of the optochip. Finally, there is a wealth of experience with regard to silicon processing, such as electrode patterning and electrical coupling techniques.

A large number of concepts and proposals have been put forward with regard to suitable geometry's for resolving the optochip-waveguide alignment problem. Many of these concepts and proposals utilize so-called V-grooves in silicon for positioning optofibres in desired places. Anisotropic etching methods afford extremely good dimension control of the V-groove, where the angle subtended by the walls of the V-form are defined by crystal planes in the silicon. For [100] silicon, where [100] denotes crystal orientation in relation to the normal vector of a silicon plate, it is possible to obtain an appropriate V-groove having a wall angle $\alpha=\arcsin\sqrt{2/3}\approx54.7$ degrees. This angle is also obtained at the end of the groove. By metallizing the end of the groove, light from an optofibre placed in the V-groove can be reflected up onto a light detector. Conversely, light from a light-emitting component can be led into the optofibre.

Mounting of an optochip is an art in itself, since the chip is connected optically, electrically, mechanically and thermally at the same time. Alignment can be achieved in several different ways. The most common method is self-alignment with solder, passive alignment with mechanical counterpressure or abutment surfaces, or a pick and place method.

The first method utilizes the surface tension forces manifested in metal solder. With the aid of well-defined, adjacent and solder-wettable surfaces on both optochip and carrier, the surface tension forces in the molten solder are able to bring the optochip to a desired position on the carrier. As the temperature falls, the solder solidifies and affixes the optochip in its correct position.

The second method is based on positioning the optochip in a desired position with the aid of micromechanical counterpressure or abutment surfaces on the carrier. These surfaces may be fabricated from silicon dioxide deposited on the carrier and thereafter patterned to form a corner into which the optochip fits. Good control of the position of the corner in relation to the waveguide and the active surface of the optochip in relation to its outer geometry enables good alignment to be achieved.

This latter method utilizes alignment marks on carrier and optochip. These alignment marks enable the components to be orientated in a common co-ordinate system with great precision. In order to subsequently assemble the components, there is required a high-class mechanical process which will enable the components to be moved in the common co-ordinate system in a predetermined manner. All three methods require mounting precision in the micrometer range. Details that lie peripheral to these methods will not be discussed in this document, although their existence is a prerequisite for the suitability of the concept described in the following.

SUMMARY OF THE INVENTION

In order to obtain a right-angled geometry when using surface-emitting or surface-detecting components, and a reduced optical travel path and accurate optofibre fixation, a reflective surface that slopes at an angle of 45 degrees has been disposed between a light-conductive core and the active surface of an optochip. The light conductive core has been caused to lie closer to the reflective surface by bevelling the optofibre and is therewith also adapted to fit between a V-groove and a flat cover for accurate fixation of the fibre. The aforesaid solutions relate essentially to problems of a geometrical nature, but provide important advantages in comparison with earlier known techniques with regard to space, signal transmission performance and manufacturing costs, similar to the arrangement of optical components in so-called optical micro-structuring techniques.

DESCRIPTION OF PREFERRED EMBODIMENTS

FIG. 1A–1D illustrate coupling of an optochip in accordance with an earlier known technique. A carrier material 2, which may be silicon, has been provided with a V-groove 3; see FIG. 1A. There has been placed in the groove an optofibre 4 and an optochip 1 has been placed over the free end of the optofibre; see FIG. 1B. When seen in cross-section, part of the optofibre 4 placed in the V-groove 3 lies outside the groove and carrier material; see FIG. 1C.

Figure 1A:
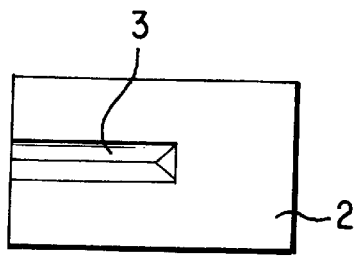
FIG. 1A illustrates from above an optofibre silicon carrier having a V-shaped groove in accordance with known techniques.
Figure 1B:
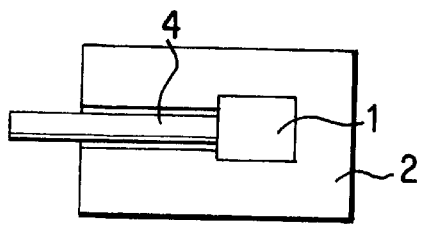
FIG. 1B illustrates from above an optofibre silicon carrier and an optochip placed in a groove in accordance with known techniques.
Figure 1C:
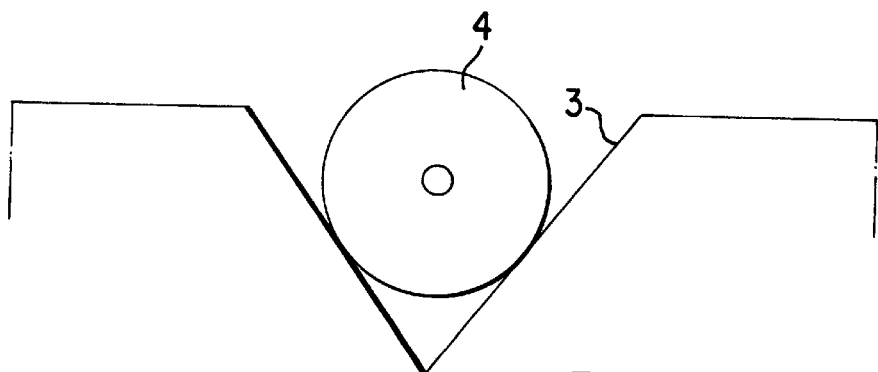
FIG. 1C is a cross-sectional view of an optofibre having a light-conductive core and placed in a V-groove in accordance with known technique.
Figure 1D:
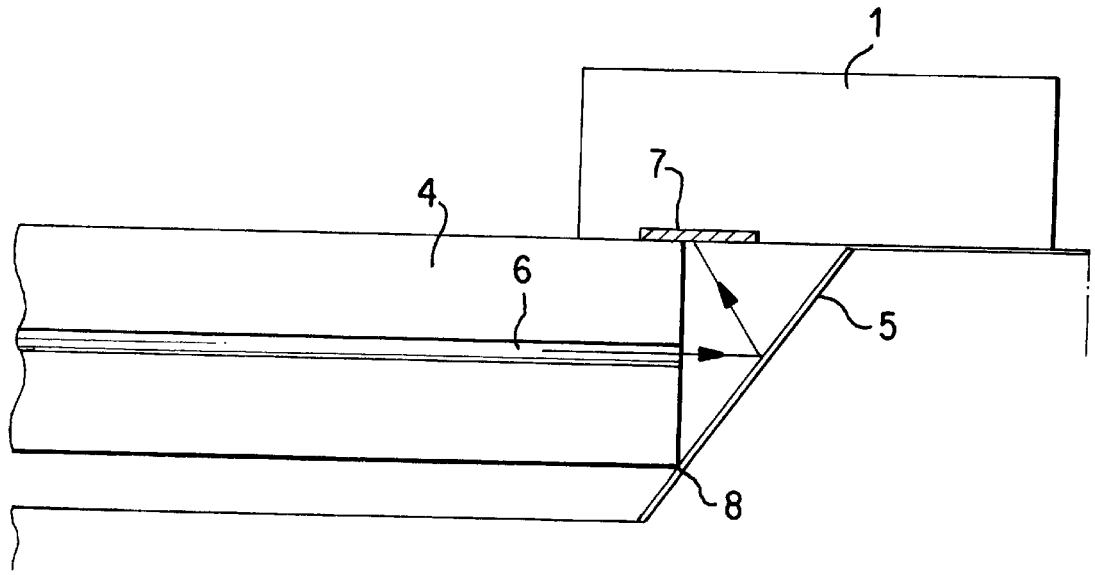
FIG. 1D is a side view of the connection of an optofibre to an optochip in accordance with FIG. 1B.

As shown in FIG. 1D, the direction of the light is changed through roughly 110 degrees subsequent to reflection in a mirror 5 on the carrier material. Consequently, this fact must be taken into account in order to achieve precise positioning of the chip/detector 1. On the other hand, this is not sufficient for a light emitting component. This is because the numerical aperture (acceptance angle) of a fibre will not permit excessively oblique incident light angles to be coupled into a single mode fibre, for instance. Consequently, a right-angled geometry based on a 45-degree mirror would be desirable. This can be achieved by using an "obliquely sawn" [100] silicon block instead of "typical" [100] silicon. In practice, such so-called wafers are obtained by sawing a silicon block obliquely, more specifically at an angle of 9.7 degrees. If this is done correctly, the mirror that was earlier inclined at 54.7 degrees will now be inclined at 45 degrees (54.7–9.7). Another feature, evident from FIG. 1D, is that the optical wavelength is relatively long between a light-conductive core 6 and an active detector surface, which may have a detrimental effect on the coupling efficiency. This is partly because the lower part 8 of the optofibre contacts the wall of the mirror, causing light to be delivered first to the mirror, and partly because in order to reach the detector the light must then pass along a path whose length corresponds to one fibre radius.

Figure 2A:
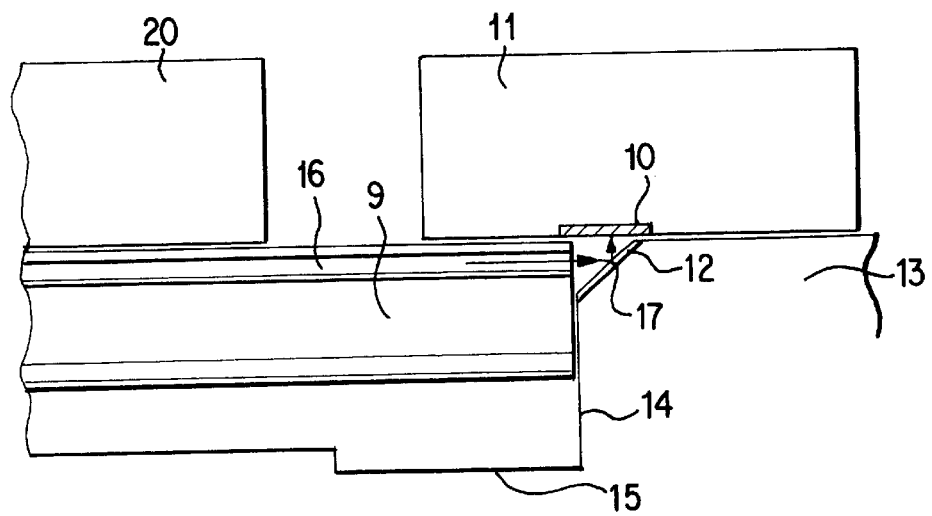
FIG. 2A is a side view of a silicon carrier for an optofibre connection, with a cover means, a groove and an optochip having an active surface in accordance with the invention.

The distance between an optofibre 9 and an active surface 10 on an optochip 11 can be decreased by reducing a first part of the distance, by "cutting off" a mirror 12 on a carrier material 13 having a "vertical" wall 14; see FIG. 2A. This is achieved conveniently by sawing. The lower part of the mirror 12 is completely sawn away with the same technique as that used to separate microelectronic chips, wherein the vertical wall 14 may commence in the bottom 15 of a groove and terminate immediately beneath a fibre core 16 on the optofibre 9. The distance between the fibre core and a reflective point 17 on the mirror may be limited to about 10 micrometers. The vertical wall 14 may also serve as an opto fibre abutment surface therewith facilitating mounting of the fibre.

The second part of the distance can be decreased by using a fibre whose outer diameter is smaller than normal, meaning that the diameter is smaller than 125 micrometers. Because it must still be possible to handle the fibre, the outer diameter or dimension may not be smaller than 60–80 micrometers. The total wavelength between the core 16 and the active surface 10 will therefore be slightly longer than about 70–90 micrometers.

Figure 2B:
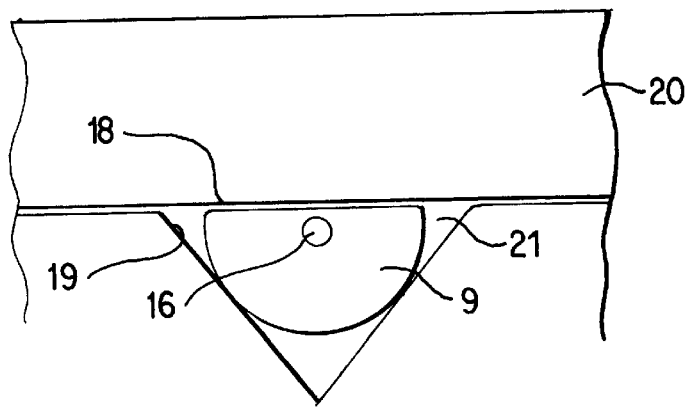
FIG. 2B is a cross-sectional view of a D-fibre between a cover means and a groove, in accordance with the invention.

With the intention of further decreasing said distance, the fibre 9 has been bevelled in the manner of a so-called D-fibre; see FIG. 2B. The D-fibre is, in principle, a typical single mode fibre although with a D-shaped cross-section, with the core 16 lying close to a flat side 18 of the original circular fibre. This particular fibre shape is obtained by sawing a preform, i.e. the "glass rod", constituting the original fibre material along its length at an appropriate distance from the core. The fibre retains the proportions of the pre-form when drawing out the fibre. This enables a fibre to be produced in which the distance between the flat side and the core centre is very short, less than 10 micrometers. By mounting a D-fibre in a V-shaped groove 9 with the flat side 18 of the D-fibre facing upwards, the total wavelength, fibre to optochip, can be kept beneath 20 micrometers.

Figure 2C:
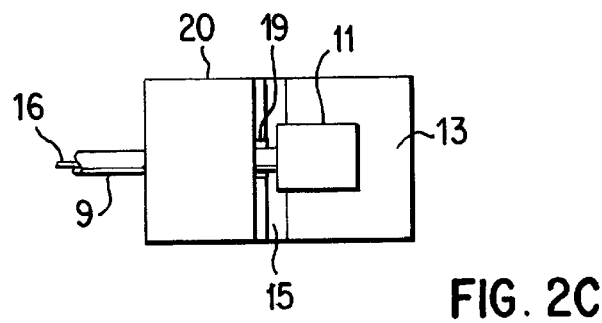
FIG. 2C illustrates an optofibre silicon carrier from above, and shows a cover means, a groove and an optochip in accordance with the invention.

Something which is not evident from FIGS. 1A–D is the difficulty experienced in placing an optofibre in a V-groove with the optofibre remaining in abutment with the walls of the groove. The optofibre is most usually glued in the V-groove. However, the glue tends to lift the fibre out of position, with a negative effect on the desired mounting precision. Consequently, the use of an auxiliary means to hold the fibre in position during the gluing process would be desirable. One such auxiliary means may have the form of a cover means or lid 20 secured on top of the carrier material, such as the silicon carrier 13, such that the V-groove 19 and the cover means 20 together form a space having triangular capillaries 21, where the optofibre fits exactly and is therefore unable to change position during the gluing process; see FIG. 2B. FIG. 2C illustrates from above the fibre 9 fixed in position by the cover means 19 and coupled to the optochip 11.

The cover means 20 may be provided conveniently by anodic bonding. An anodic bond is effected by placing together a substrate carrier and a cover means, which may be made of silicon or transparent glass, heating the assembly and applying an electric potential. Mobile ions produce a high field strength across a joint, where the electrostatic forces contribute towards creating durable bonds on an atomic scale. The strength of the joint is comparable with a strong glue joint. Bonding is preferably effected on a so-called wafer level, whereafter separate carriers can be sawn from the wafer. The carrier/cover assembly is configured to enable certain parts of the cover to be sawn away so as to provide a suitable optochip mounting surface. The combination of triangular capillaries 21 and D-fibre 9 is particularly suitable, since it is otherwise difficult to ensure that the D-fibre will be affixed with its flat side upwards, since the D-fibre will only fit with the V-groove capillary when positioned correctly.

The aforedescribed solutions provide an optically microstructure which is accurately fixated, has a short optical wavelength and is particularly suited for mounting on light-emitting or light-detecting optochips mounted on silicon carriers.

We claim:

1. An arrangement for coupling a waveguide to a light-emitting or light-detecting component, the arrangement comprising:

a sloped reflective surface arranged with a slope forward of the waveguide and beneath the component, the waveguide being bevelled such that the waveguide has a non-circular cross-section so that a core of the waveguide lies relatively close to an active surface of the component when the waveguide is coupled to said component.

2. An arrangement according to claim 1, further comprising a groove having a groove bottom disposed between the V-groove and the reflective surface.

3. An arrangement according to claim 2, wherein the reflective surface is interrupted by a wall surface beneath the waveguide core.

4. An arrangement according to claim 3, wherein the wall surface is beneath and adjacent the reflective surface and forms part of the groove and a waveguide abutment means when the waveguide is mounted in the V-groove.

5. An arrangement according to claim 1, further comprising a cover means fixating the bevelled waveguide between the cover means and a V-groove in a carrier substrate.

6. The arrangement according to claim 1, wherein the reflective surface is sloped 45 degrees forward of the waveguide.

7. The arrangement according to claim 1, wherein the cross-section of the bevelled waveguide is D shaped.

8. A method of coupling a waveguide to a light-emitting or light detecting component, the method comprising the steps of:

providing a bevelled waveguide such that the waveguide has a non-circular cross-section; and arranging a reflective surface between the bevelled waveguide and the component so that a core of the waveguide lies relatively close to an active surface of the component.

9. A method according to claim 8, wherein the bevelled waveguide is a D-fibre having a D shaped cross-section.

10. A method according to claim 9, further comprising:

providing a V-groove for receiving the D-fibre; and fixating the D-fibre in a position in the V-groove, the D shaped cross section enabling the D-fibre to be held against the V-groove with the aid of a cover means.

11. A method according to claim 8, further comprising the step of coupling the waveguide to said component.

* * * * *